Jan 6, 1931.     N. R. WHITE     1,787,807
LEVELING ATTACHMENT FOR THRASHING AND OTHER MACHINES
Filed Dec. 11, 1928
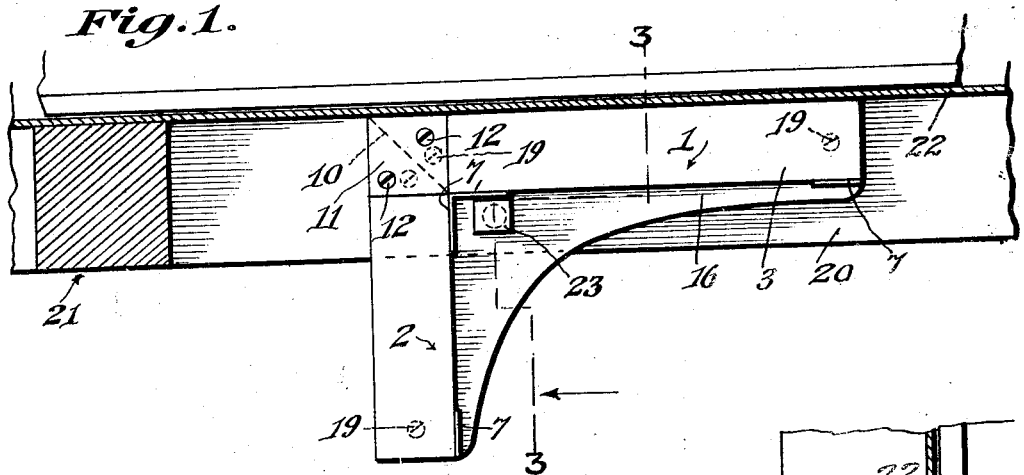
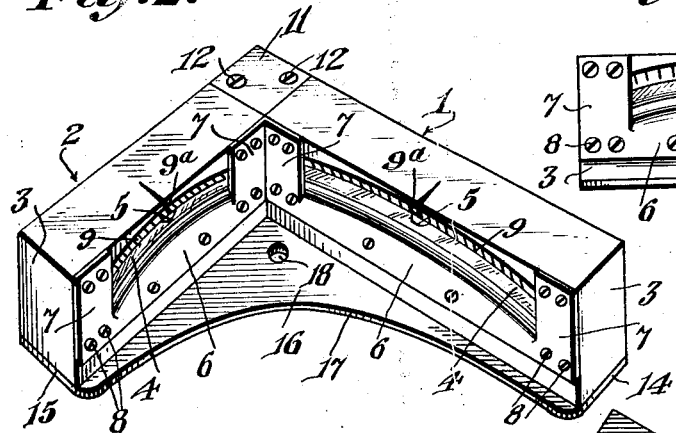
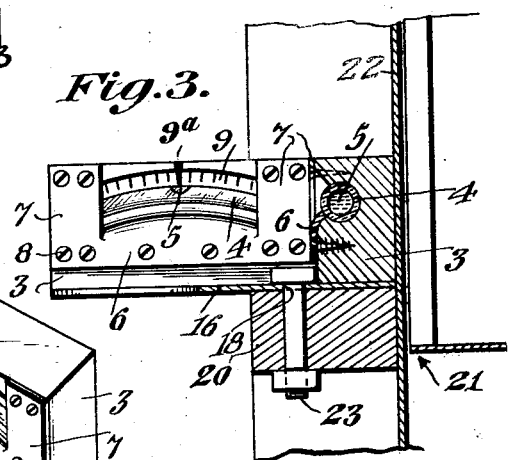
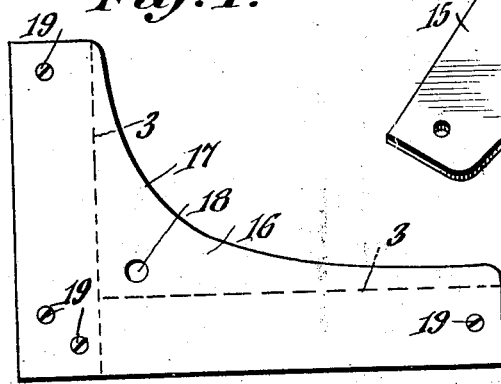
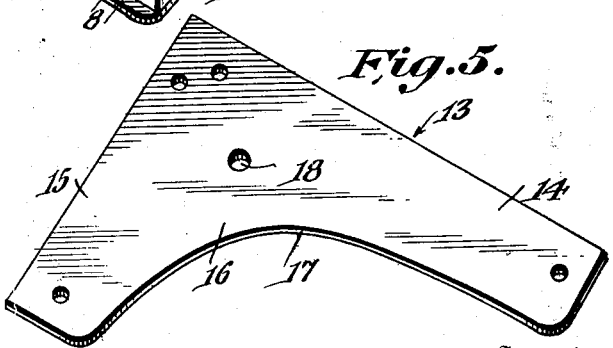
Inventor
Noah R. White,
By Irving L. McCathran
Attorney Patented Jan. 6, 1931

1,787,807

UNITED STATES PATENT OFFICE

NOAH R. WHITE, OF DELTA, COLORADO

LEVELING ATTACHMENT FOR THRASHING AND OTHER MACHINES

Application filed December 11, 1928. Serial No. 325,342.

This invention relates to leveling devices, and has for one of its objects to provide a novel device of this character which shall be adapted to be used in connection with thrashing machines, clover hullers, bean separators and the like when they are being set up in the field to arrange them in a truly horizontal position so as to permit them to operate at their highest efficiency and so as to permit them to be operated with the least possible strain on their drive belts and on the tractors or other power plants.

The invention has for another object to provide a device of the character stated which shall be adapted to indicate any transverse or longitudinal deviation of the machine from the horizontal and which shall be adapted to be secured to a sill or other suitable part of a separator, whereby to permit the machine to be leveled with less labor and in shorter time than is now possible.

The invention has for a further object to provide a device of the character stated which shall embody angularly related spirit levels and a bracket to which the levels are secured and which shall be adapted to be readily secured to the sill or other suitable part of the machine.

With the foregoing and other objects in view, the nature of which will appear as the description proceeds, the invention consists in the construction, combination and arrangement of parts hereinafter fully described and claimed, and illustrated in the accompanying drawing, wherein:

Figure 1 is a view partly in top plan and partly in horizontal section illustrating the application of the leveling device to a thrashing machine or other separator;

Figure 2 is a perspective view of the leveling device;

Figure 3 is a sectional view taken on the vertical planes indicated by the line 3—3 of Figure 1;

Figure 4 is a bottom plan view of the leveling device, and

Figure 5 is a perspective view of the bracket of the leveling device.

The leveling device comprises levels 1 and 2. The level 1 is longer than the level 2. In other respects, the levels 1 and 2 are similar, and as shown each comprises a stock 3 which may be made from wood or metal and is provided in the front side thereof with an arcuate groove for the reception of a similarly formed glass tube 4. The tube 4 is filled with a suitable liquid in a manner to provide an air bubble 5. The tube 4 is held in place by a plate 6 provided with end pieces or blocks 7 and secured in place by screws 8. The stock 3 is provided immediately above the spirit tube 4 with a downwardly and rearwardly inclined or beveled arcuate portion which bears a scale 9 marked with graduations calibrated in inches, the zero point 9a of the scale being located centrally between the ends thereof.

The levels 1 and 2 are arranged in right angular relation. The stocks 3 have their adjacent ends beveled, as at 10, and are secured together by a plate 11 which is recessed in the upper sides of the ends of the stocks and is secured in place by screws 12.

The levels 1 and 2 are carried by a bracket 13 having right angularly related long and short arms 14 and 15, respectively, and a web 16 arranged between the front edges of the arms and having an arcuate edge 17 and an opening 18. The level 1 is arranged on the long arm 14 and the level 2 on the short arm 15 of the stock 3 with their outer sides of the same vertical plane with the rear edges of the arms and with the web 16 extending forwardly beyond their front sides. The levels 1 and 2 are secured to the bracket 13 by screws 19.

In practice, the leveling device is secured to the sill 20 of a thrashing machine or other separator 21 with the bracket 13 resting upon the sill in a manner to arrange the level 1 longitudinally and the level 2 transversely of the machine, as clearly shown in Figures 1 and 3. The level 1 and the rear edge of the bracket arm 14 are preferably arranged in contact with the adjacent side 22 of the machine. A bolt 23 passing through the opening 18 of the bracket 13 and through the sill 20, secures the leveling device firmly in place. As the leveling devices 1 and 2 extend respectively longitudinally and transversely of the machine, and as the scales 9 are calibrated in inches, the extent that the machine should be raised or lowered at one or more corners thereof, in order to effect the leveling of the machine, may be readily ascertained. The machine may be leveled by means of blocks or by digging one or more holes in the ground for the reception of one or more wheels of the machine.

From the foregoing description, taken in connection with the accompanying drawing, it will be understood that the leveling device is simple, durable and highly efficient, that it may be manufactured and sold at low cost, that its spirit tubes are amply protected from injury, and that it may be easily and quickly secured to the machine.

While I have described the principle of the invention, together with the device which I now consider to be the best embodiment thereof, I wish it understood that the structure shown is merely illustrative and that such changes may be made therein as fall within the scope of the invention and claim.

What I claim is:

A leveling attachment for a machine comprising a horizontally disposed bracket having angularly related arms provided with plain flat upper faces and a connecting web arranged in and between the front edges of the arms and having an attaching bolt receiving opening therein, a vertically disposed level stock arranged upon the upper face of each arm with its rear face in the same vertical plane with the rear edge of its respective bracket, and said level stocks having their adjacent ends beveled and arranged in abutting relation, and means securing the level stocks to the bracket rearwardly of the web.

In testimony whereof I affix my signature.

NOAH R. WHITE.